United States Patent [19]

DaPonte et al.

[11] Patent Number: 4,818,597
[45] Date of Patent: Apr. 4, 1989

[54] HEALTH CARE LAMINATE

[75] Inventors: Diego H. DaPonte, Woodstock; Norman K. Fox, LaGrange; Robert A. Funk, Roswell, all of Ga.

[73] Assignee: Kimberly-Clark Corporation, Neenah, Wis.

[21] Appl. No.: 148,817

[22] Filed: Jan. 27, 1988

[51] Int. Cl.$^4$ .............................................. B32B 27/00
[52] U.S. Cl. ................................. 428/284; 428/171; 428/172; 428/286; 428/297; 428/298; 428/299; 428/340; 428/903
[58] Field of Search ............... 428/171, 172, 284, 286, 428/297, 298, 340, 903, 299

[56] References Cited

U.S. PATENT DOCUMENTS

| | | | |
|---|---|---|---|
| 3,276,944 | 10/1966 | Levy | 161/150 |
| 3,338,992 | 8/1967 | Kinney | 264/24 |
| 3,341,394 | 9/1967 | Kinney | 161/72 |
| 3,502,538 | 3/1970 | Petersen | 161/150 |
| 3,502,763 | 3/1970 | Hartmann | 264/210 |
| 3,509,009 | 4/1970 | Hartmann | 161/150 |
| 3,542,615 | 11/1970 | Dobo et al. | 161/150 |
| 3,692,618 | 9/1972 | Dorschner et al. | 161/72 |
| 3,849,241 | 11/1974 | Butin et al. | 161/169 |
| 4,041,203 | 8/1977 | Brock et al. | 428/157 |
| 4,115,605 | 9/1978 | Hultman et al. | 427/377 |
| 4,436,780 | 3/1984 | Hotchkiss et al. | 428/298 |
| 4,493,868 | 1/1985 | Meitner | 428/903 |
| 4,508,113 | 4/1985 | Malaney | 428/212 |
| 4,555,811 | 12/1985 | Shimallo | 428/298 |
| 4,618,524 | 10/1986 | Groitzsch | 428/298 |
| 4,692,368 | 9/1987 | Taylor et al. | 428/903 |
| 4,720,415 | 1/1988 | Vander Wielen | 428/903 |
| 4,753,843 | 6/1988 | Cook et al. | 428/903 |
| 4,758,239 | 7/1988 | Yeo et al. | 428/903 |
| 4,769,279 | 9/1988 | Graham | 428/903 |

FOREIGN PATENT DOCUMENTS 803714  1/1969  Canada .

OTHER PUBLICATIONS

NRL Report No. 4364, "Manufacture of Superfine Organic Fibers," by V. A. Wendt, E. L. Booh, C. D. Fluharty.
NRL Report No. 5265, "An Improved Device for the Formation of Superfine Thermoplastic Fibers," by K. D. Lawrence, R. T. Lukas, J. A. Young.

Primary Examiner—James J. Bell
Attorney, Agent, or Firm—William D. Herrick

[57] ABSTRACT

There is disclosed nonwoven composite fabric comprising a central melt-blown web preferably formed of collected, entangled, elastic or adhesive nonwoven fibers comprising poly (ethylene-vinyl acetate), where the central web is polar and of relatively low melting point. This central web is positioned next to or bonded to two other insulative nonwoven webs of non-polar, melt-blown fibers, which in turn are positioned next to or bonded to two outer nonwoven webs of spun-bonded fibers. The composites are useful for health care fabrics such as drapes, protective covers, and the like.

4 Claims, 2 Drawing Sheets

HEALTH CARE LAMINATE

BACKGROUND OF THE INVENTION

The invention relates generally to nonwoven cloth-like fabrics and more particularly concerns health care laminates which incorporate one or more layers of elastic or adhesive nonwoven webs formed from a polar polymer.

Conventional nonwoven health care fabrics generally have been restricted to laminates of non-polar, relatively high melting temperature thermoplastics. This restriction is the result of limitations imposed by standard treatments designed to impart anti-static properties and alcohol repellency to such fabrics for use in health care applications. Such repellency treatments require soaking the fabric in a fluorocarbon surfactant dissolved in a polar alcoholic solvent and subsequent processing of the material through drying cans which expose the fabric to significant heat. Hultman et al. U.S. Pat. No. 4,115,605 discloses such a standard treatment.

Low-crystallinity polymers, such as poly (ethylene-vinyl acetate) (EVA), which possess desirable adhesion, softness, drape, and hand, usually contain polar groups and cannot be treated with polar alcoholic solvents. These polar groups absorb the polar solvent and retain its undesirable odor even after drying. In addition, the heat of the drying process often degrades these polar polymers such that they pass into the liquid phase and harden into a film upon cooling. As a result, prior art fabrics for health care applications have not been able to use low crystalline, polar polymers and have had to sacrifice the softness and desirable textural characteristics that those polymers possess.

SUMMARY OF THE INVENTION

It is an object of the present invention to provide a nonwoven cloth-like health care laminate which incorporates at least one layer of an elastic, nonelastic, or adhesive nonwoven web formed from a polar polymer that can be treated with alcoholic solvents and thereafter heat-dried without degrading the laminate fabric and without retaining objectionable odors.

It is also an object of the present invention to provide a cloth-like health care laminate having at least one central layer of polar polymer fibers that is sandwiched between and protected by insulative layers of non-polar, temperature resistant polymer fibers.

The foregoing objectives are achieved by a health care laminate comprising five layers including a central melt-blown nonwoven layer of randomly oriented discontinuous discrete thermoplastic fibers which are made from a polar polymer. The central layer may be formed from fibers consisting entirely of poly (ethylene-vinyl acetate). Nonwoven webs of this type have superior elasticity and are preferred for many applications. Where a less elastic central layer is desired, it may be formed from a nonwoven web made from poly (ethylene-ethyl acrylate), poly (ethylene-acrylic acid), or poly (ethylene-methyl acrylate), or other suitable polymer.

Insulative layers are disposed on either side of the central layer. The insulative layers are nonwoven, melt-blown webs of randomly oriented and discontinuous discrete thermoplastic fibers. The insulative layers protect the central layer so that the composite fabric can be treated with polar solvents and heat. In addition, the insulative layers help prevent bacteria migration through the central layer and from one side of the fabric to another. The insulative layers may be each formed of the same or different non-polar, heat resistant thermoplastic polymers. For example, one of these two layers may be formed of a nonwoven web of melt-blown polypropylene fibers, and the other may be formed from melt-blown polyethylene fibers.

Outer layers on either side of the insulative layers are formed of nonwoven webs of randomly oriented continuous thermoplastic filaments which may be of the same or different spun-bonded thermoplastic material. Thus, the outer layers both may be made of spun-bonded polypropylene, polyethylene, random copolymers of ethylene and propylene, or blends of polyethylene and polypropylene, or each of the outer layers may be made of one or the other of these polymers. The outer spun-bonded layers give strength and texture to the fabric.

The layers are calendered and embossed to produce a health care laminate which can be subjected to standard treatments using polar alcohol to produce a static-resistant, alcohol repellent fabric of improved drape, hand, and flexibility. As a result of using a polar polymer layer, laminates made in accordance with the present invention exhibit cloth-like characteristics in terms of drape, softness, and hand while at the same time having advantageous characteristics for health care applications in terms of strength, barrier properties, anti-static properties, and alcohol repellency. The use of the above polar polymer layers which are adhesive in nature also allows for bonding of different polymers without the bonding being disrupted by the alcohol and heat treatments.

Other objects and advantages of the present invention will become apparent upon reading the following detailed description and upon reference to the drawings.

DETAILED DESCRIPTION OF THE INVENTION

While the invention will be described in connection with the preferred embodiment and procedure, it will be understood that we do not intend to limit the invention to that embodiment or procedure. On the contrary, we intend to cover all alternatives, modifications, and equivalents as may be included within the spirit and scope of the invention as defined by the appended claims.

Figure 1:
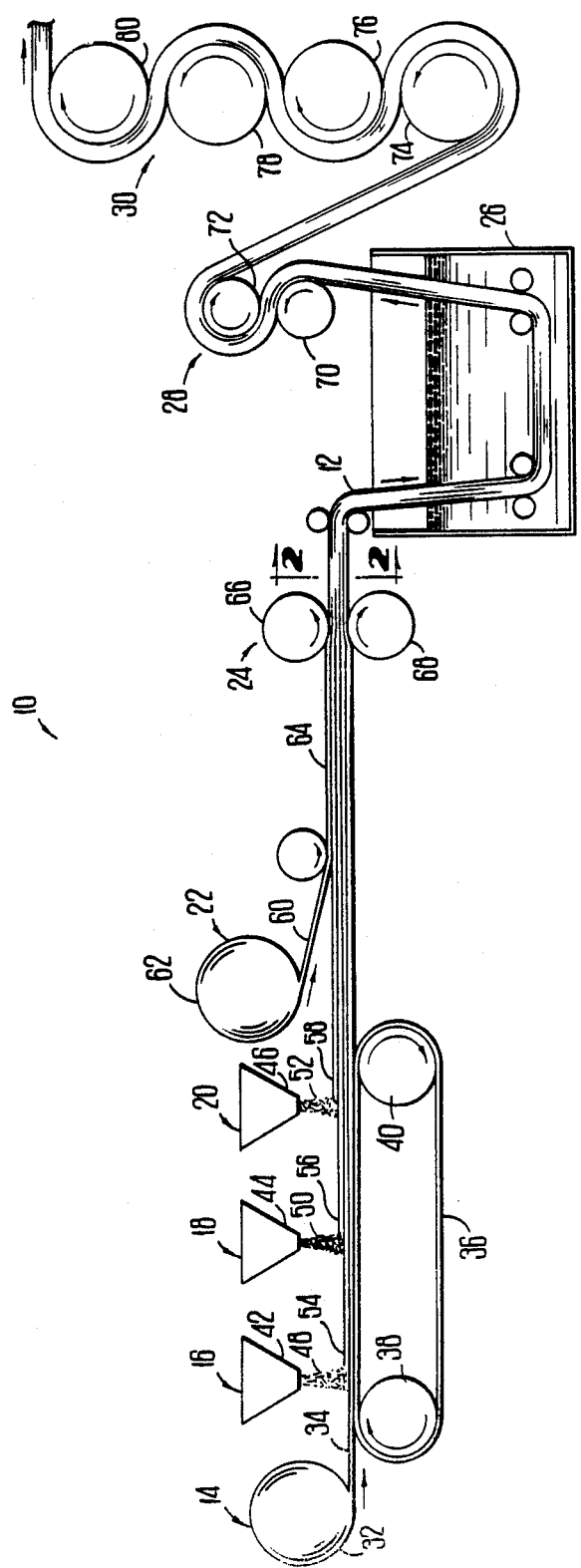
FIG. 1 is a schematic representation of the machinery and process of manufacturing the health care laminate of the present invention.
Figure 2:
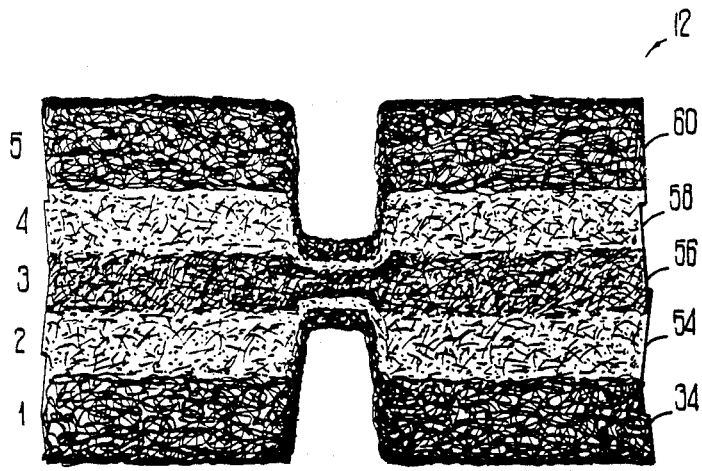
FIG. 2 is a cross sectional view of the laminate of the present invention showing the layers as seen along line 3—3 of FIG. 1.

Turning first to FIG. 1, there is schematically illustrated machinery 10 and a process for manufacturing the health care laminate 12 of the present invention. The machinery 10 includes an outer layer unwind station 14, an insulative layer melt-blowing station 16, a central layer melt-blowing station 18, another insulative layer melt-blowing station 20, another outer layer unwind station 22, a calendering station 24, a treatment bath 26, a wringer station 28, and a drying station 30.

The outer layer unwind station 14 consists of a roll 32 of spun-bonded fabric 34. The spun-bonded fabric 34 is unwound onto a moving foraminous belt 36 mounted on rollers 38 and 40 for movement as indicated by the arrows. The spun-bonded web 34 provides a carrier onto which melt-blowing die heads 42, 44, and 46 deposit melt-blown fibers 48, 50, and 52 to form melt-blown layers 54, 56, and 58 respectively. After melt-blown layer 58 has been deposited, another spun-bond web 60 is unwound from unwind station 22 from roll 62 to produce an unbonded five layer composite 64. It should be understood that the composite 64 could also be prepared on a single forming line in which the spun-bonded fabrics 34 and 60 are formed in situ. See also Brock et al. U.S. Pat. No. 4,041,203.

The nonwoven spun-bond webs 34 and 60 are prepared in conventional fashion such as illustrated by the following patents: Dorschner et al. U.S. Pat. No. 3,692,618; Kinney U.S. Pat. Nos. 3,338,992 and 3,341,394; Levy U.S. Pat. No. 3,276,944; Peterson U.S. Pat. No. 3,502,538; Hartmann U.S. Pat. Nos. 3,502,763 and 3,909,009; Dobo, et al, U.S. Pat. No. 3,542,615; and Harmon Canadian Pat. No. 803,714. Spun-bonded materials prepared with continuous filaments generally have at least three common features. First, the polymer is continuously extruded through a spinneret to form discrete filaments. Second, the filaments thereafter are drawn either mechanically or pneumatically without breaking in order to molecularly orient the polymer filaments and achieve tenacity. Last, the continuous filaments are deposited in a substantially random manner onto the carrier belt to form the web. Once the spun-bonded webs 34 and 60 have been prepared, they may be calendered and collected on a roll for future processing in accordance with the process shown schematically in FIG. 1. Alternatively, the spun-bonded web 34 may be fed directly to the downstream melt-blown stations 16, 18, and 20 where it forms the substrate for collecting the randomly oriented discrete discontinuous fibers 48, 50, and 52 of the melt-blown layers 54, 56, and 58. The spun-bonded web 60 may be formed in situ on top of the last melt-blown layer 58.

The construction and operation of the melt-blowing stations 16, 18, and 20 for forming microfibers and melt-blown layers 54, 56, and 58 are considered conventional, and the design and operation are well within the skill of those of ordinary skill in the art. Such skill is demonstrated by NRL Report 4364, "Manufacture of Super-Fine Organic Fibers," by V. A. Wendt, E. L. Boon, and C. D. Fluharty; NRL Report 5265, "An Improved Device for the Formation of Super-Fine Thermoplastic Fibers," by K. D. Lawrence, R. T. Lukas, and J. A. Young; and, U.S. Pat. No. 3,849,241, issued Nov. 19, 1974, to Buntin, et al.

The composite 64 consisting of unbonded layers 34, 54, 56, 58 and 60 is fed to the calendering station 24. The calendering station 24 consists of bonding rolls 66 and 68 which may have bonding patterns (protrusions) engraved on their surfaces. The rolls are heated and forced together so that the protrusions engraved on the surfaces form spot bonds or pattern bonds between the layers of the web. In practice, the bonded area (the area of the protrusions on the rollers) should occupy between 10% and 30% of the total area of the web's surface. The bonding pattern or spot bonding is used to assure that the majority of the fabric maintains its loft and therefore insulative capabilities resulting therefrom. The percentage of bonded areas is selected to assure adequate bonding between the layers so that delamination of the layers does not result during ordinary handling of the fabric. Bonding is usually accomplished by subjecting bonding sites on the composite 64 to temperatures in the range from at least about 65° C. to about 120° C., and preferably from at least 70° C. to about 90° C. The pressure on the fabric between the two rolls is between 25 and 40 pounds per square inch (psi). The line speed is between 350 feet per minute (ft/min) and 1500 ft/min.

The resulting laminate 12 at the output of the calendering station 24 is fed to treatment bath 26 where it is immersed into a fluorocarbon surfactant dissolved in a polar alcohol in order to impart anti-static properties and alcohol repellency to the laminate 12. In order to achieve alcohol repellency and electrical conductivity a mixture comprised by weight of about 2.15% of a polymeric fluorocarbon, 0.09% lithium nitrate, 0.07% hexanol, and 97.06% water is applied to the fabric. The polymeric fluorocarbon is 3M FC808 manufactured by 3M Company, St. Paul, Minn. The treatment results in a dry add on weight (as a percentage of the web weight) of 0.3% for the polymeric fluorocarbon and of 0.03% for the lithium nitrate. The treatment carried out in bath 26 is in accordance with the disclosure of Hultman et al. U.S. Pat. No. 4,115,605.

The laminate 12 exits the treatment bath 26 and passes between rolls 70 and 72 of wringer station 28. The pressure at the nip between rolls 70 and 72 wrings the excess surfactant solution from the laminate 12.

From the wringer station 28, the laminate 12 proceeds to the drying station 30 where it snakes its way around heated drying cans 74, 76, 78, and 80. The drying cans are heated to between 90° C. and 142° C., and the time of contact between the laminate 12 and the drying cans is between 4 seconds and 45 seconds.

The central layer 56 of the laminate 12 of the present invention is a polar polymer and imparts internal adhesion, softness, drape, and hand to the laminate 12. The polar polymer may be selected from the group consisting of poly (ethylene-vinyl acetate), poly (ethylene-acrylic acid), poly (ethylene-ethyl acrylate), and poly (ethylene-methyl acrylate). Poly (ethylene-vinyl acetate) (EVA) is generally preferred. EVA that has a melt index in the range of 32 to 300 at 190° C. (a melt index of 190 is preferred at 190° C.) and consists of from 10% to 50% by weight (and preferably 18% by weight to 36% by weight) of vinyl acetate is preferred. The central layer is a melt-blown non-woven web having a basis weight preferably between 0.15 ounces per square yard (oz/yd$^2$) and 1.0 oz/yd$^2$ although the basis weight may vary with the intended use of the laminate 12. In general, the basis weight of central layer 56 should be about 10.0% of the basis weight of the laminate 12.

The insulative layers 54 and 58 of the laminate 12 of the present invention are non-woven melt-blown webs formed from non-polar heat resistant polymers. Polyolefins are preferred for the insulative layers 54 and 58, and the specific polymers include polypropylene, polyethylene, random co-polymers of ethylene and propylene, and blends of polyethylene and polypropylene. The selection of a particular polymer depends on the intended use of the laminate 12. In that regard, polyethylene fibers generally provide greater softness, while polypropylene fibers generally provide greater strength and resistance to heat.

In order to realize the advantages of the present invention, the insulative layers generally should have a basis weight preferably between 0.10 oz/yd$^2$ and 1.0 oz/yd$^2$, although the basis weight may vary with the intended use of the laminate 12. In general, the lower limit of the basis weight for each insulative layer is determined by the thermal insulation required to protect the central layer 56 from heat during the drying process and by the imperviousness required to protect the central layer 56 from the polar alcohol solution used in connection with anti-static and alcohol repellency treatment. Consequently, it is believed that for insulative layers formed of polypropylene, the minimum basis weight is 0.10 for each layer while the minimum basis weight for each insulative layer formed of polyethylene is 0.10.

The outer layers 34 and 60 of laminate 12 of the present invention consist of non-woven spun-bonded webs formed from non-polar heat resistant polymers. Polyolefins are preferred and as with the insulative layers, specific useful polyolefins include polypropylene, polyethylene, random co-polymers of ethylene and propylene, and blends of polyethylene and polypropylene. The outer layers 34 and 60 are designed to provide softness, abrasion resistance, and strength depending on the intended use of the laminate 12. In that regard, polyethylene fibers generally provide greater softness while polypropylene fibers generally provide greater strength and heat resistance.

Each of the outer layers 34 and 60 has a basis weight of at least 0.10 oz/yd$^2$, preferably between 0.45 oz/yd$^2$ and 1.0 oz/yd$^2$, although the basis weight may vary with the intended use of the laminate 12. In general, the basis weight of the outer layers 34 and 60 depends on the amount of strength and abrasion resistance needed by the laminate to serve its intended purpose.

The resulting fabric laminate must possess several important characteristics. The fabric must be strong enough for its intended use but be light in weight for ease of handling. Thus, although each layer of the laminate may have a basis weight of at least 0.10 oz/yd$^2$, all five layers in a particular laminate should not have the same basis weight of 0.10 oz/yd$^2$. A laminate of 0.50 oz/yd$^2$ (0.10 oz/yd$^2$/layer×5 layers) would likely be too fine for most applications. Depending upon the desired applications, certain of the layers will have basis weights greater than 0.10 oz/yd$^2$ and thus will impart relatively more of their characteristics to the particular laminate. Consequently, the basis weight of the laminate should be between 1.40 oz/yd$^2$ and 3.0 oz/yd$^2$. Such a laminate should possess tensile strength between 12 lbs. and 20 lbs. as measured in accordance with Federal Test Method (FTM) 5100. The laminate 12 also should not be stiff so that it is easy to handle and drape. The drape stiffness should be between 2.6 centimeters and 1.90 centimeters as measured in accordance with FTM 190A, method 5206. The laminate 12 for use in health care applications should provide a barrier against a transmission of bacteria. Laminates in accordance with the present invention exhibit barrier properties of above 20 as measured by FTM 191A Method 5514. The laminate 12 should also have sufficient internal adhesion to resist delamination during handling. Finally, the insulative layers should be sufficiently impervious to insure that the polar alcohol does not bond with the polar polymer of the central layer thereby producing an objectionable odor. The laminate 12 thus should have a Frazier porosity of less than 450 ft$^3$/min/ft$^2$ as measured by FTM 191A Method 5450.

The present invention is illustrated by the following example:

| Example 1 | |
|---|---|
| Central layer - melt-blown | |
| Polymer | Poly(ethylene-vinyl acetate) LD764.36, 28% vinyl acetate 190 melt index Exxon Chemicals Co. Baytown, Texas |
| Basis weight | 0.12 oz/yd$^2$ |
| Insulative layers - melt-blown | |
| Polymer | Polypropylene Himont PC-973 Himont USA, Inc. Wilmington, Delaware |
| Basis weight | 0.12 oz/yd$^2$ |
| Outside layers - spun-bonded | |
| Polymer | Copolymer of propylene, ethylene WRS-6-144 Shell Chemical Co. Houston, Texas |
| Basis weight | 0.53 oz/yd$^2$ |
| Lamination | |
| Percent bonded | about 15% |
| Temperature | about 260° F. |
| Pin Pressure | 50,000–150,000 psi |
| Treatment Bath | |
| Treated with a mixture of: | |
| polymeric fluorocarbon | 2.15% |
| lithium nitrate | 0.09% |
| hexanol | 0.70% |
| water | 97.06% |
| dry add on by weight of web: | |
| polymeric fluorocarbon | 0.3% |
| lithium nitrate | 0.03% |
| Dry | |
| Temperature | 120°C. |
| Time | 15 sec. |
| Laminate specifications | |
| Basis weight | 1.4 oz/yd$^2$ |
| Grab tensile $^{MD}$/CD | 19.4 lbs./15.1 lbs. |
| Drape stiffness $^{MD}$/CD | 2.1 cm/2.2 cm |
| Barrier properties | 22.4 cm |

We claim:
1. A nonwoven laminate comprising
    (a) a central layer of melt-blown thermoplastic fibers of a polar polymer;
    (b) insulative layers on each side of the central layer and formed of melt-blown fibers of a non-polar polymer; and
    (c) outer layers outside each insulative layer and formed of spun-bonded filaments of a non-polar polymer.
2. The laminate of claim 1, wherein each insulative layer has a basis weight greater than 0.10 oz/yd$^2$.
3. The laminate of claim 2, wherein the polar polymer is selected from the group consisting of poly (ethylene-vinyl acetate), poly (ethylene-ethyl acrylate), poly (ethylene-acrylic acid), poly (ethylene-methyl acrylate).
4. The laminate of claim 2 or 3, wherein the non-polar polymers are selected from the group consisting of polypropylene, polyethylene, random co-polymers of ethylene and propylene, and blends of polypropylene and polyethylene.

* * * * *